United States Patent
Adam et al.

(10) Patent No.: US 6,825,290 B2
(45) Date of Patent: Nov. 30, 2004

(54) PROCESS FOR THE PREPARATION OF LATICES USING BLOCK COPOLYMERS AS SURFACTANTS

(75) Inventors: Hervé Adam, Princeton, NJ (US); Wan-Li Liu, Belle Mead, NJ (US)

(73) Assignee: Rhodia Inc., Cranbury, NJ (US)

( * ) Notice: Subject to any disclaimer, the term of this patent is extended or adjusted under 35 U.S.C. 154(b) by 17 days.

(21) Appl. No.: 10/137,944

(22) Filed: May 2, 2002

(65) Prior Publication Data

US 2002/0198316 A1 Dec. 26, 2002

Related U.S. Application Data

(60) Provisional application No. 60/288,846, filed on May 4, 2001.

(51) Int. Cl.[7] .................................................. C08F 2/00
(52) U.S. Cl. ............................ 526/75; 526/77; 526/78; 526/80; 526/201; 526/220; 526/193; 526/922; 526/219; 526/227; 526/319; 526/327; 525/259; 525/314
(58) Field of Search ............................. 526/75, 77, 78, 526/80, 201, 220, 193, 922, 219, 227, 319, 327; 525/259, 314

(56) References Cited

U.S. PATENT DOCUMENTS

| | | | | |
|---|---|---|---|---|
| 4,908,155 A | * | 3/1990 | Leemans et al. ............... 516/57 |
| 5,332,782 A | * | 7/1994 | Liu et al. ....................... 525/66 |
| 5,484,866 A | * | 1/1996 | Loveless et al. ............ 526/340 |
| 5,489,649 A | * | 2/1996 | Liu et al. ..................... 525/193 |
| 6,124,382 A | * | 9/2000 | Corpart et al. ............... 523/501 |
| 6,153,705 A | * | 11/2000 | Corpart et al. ............... 525/244 |
| 6,354,597 B1 | * | 3/2002 | Garnier et al. ............... 277/508 |
| 6,472,486 B2 | * | 10/2002 | Klaerner et al. ............. 526/220 |
| 6,518,364 B2 | * | 2/2003 | Charmot et al. ............. 525/259 |
| 6,559,255 B2 | * | 5/2003 | Klaerner et al. ............. 526/220 |
| 2002/0010267 A1 | * | 1/2002 | Klaerner et al. ............... 525/91 |

* cited by examiner

Primary Examiner—Tatyana Zalukaeva

(57) ABSTRACT

A subject-matter of the present invention is a process for the preparation of a latex by radical aqueous emulsion polymerization in the presence of at least one ethylenically unsaturated monomer, of at least one radical polymerization initiator and of at least one surface-active block copolymer comprising at least one hydrophilic block and at least one hydrophobic block which is prepared by a "living" or "controlled" preparation process, the said copolymer exhibiting a number-average molecular mass of between 2 000 and 20 000, preferably between 4 000 and 16 000, a glass transition temperature of the hydrophobic block of less than 30° C., preferably of less than 25° C., and greater than –100° C., and a surface tension of less than 60 millinewtons per metre (mN/m), preferably of less than 50 mN/m, measured at a concentration in demineralized water of less than or equal to $10^{-4}$ mol/l at 20° C. and under one atmosphere, and the transfer agent having been rendered inert with respect to the said radical polymerization. The latices obtained can be used in particular in paints, adhesives and building materials.

16 Claims, No Drawings

US 6,825,290 B2

PROCESS FOR THE PREPARATION OF LATICES USING BLOCK COPOLYMERS AS SURFACTANTS

This application claims priority under 35 U.S.C. §§119 and/or 365 to 60/288,846 filed in the United States on May 4, 2001, the entire content of which is hereby incorporated by reference.

A subject-matter of the present invention is a process for the preparation of latices using block copolymers as surfactants and the latex compositions prepared by the said process.

The invention likewise relates to the preparation of latices exhibiting high resistance to water and which can be used in particular as concrete or cement additive in formulations intended for applications in particular in building materials, adhesives, paints or papers.

Latices are products which are well known to a person skilled in the art, as well as the redispersible powders obtained from these latices. They have numerous applications, in particular as additives in paint formulations or paper formulations (coating slips, bulk paper) or in formulations intended to be applied in the construction field (adhesive, pastes, smoothing coats, and the like). They confer important properties on the formulas in the composition of which they participate, by virtue, for example, of their binding capability, of their film-forming capability and of their ability to confer specific rheological properties.

Generally, for all latex applications, the aim is to reconcile good colloidal stability of the aqueous formulas before drying and good resistance to water after drying.

Processes for the preparation of latices have been well known for many years. It is also known to add a surfactant of low molecular weight to the aqueous phase, so as to keep in suspension both the monomers and the polymers in small spheres in suspension in the water, within which spheres the radical polymerization reaction takes place. However, this addition of surfactant has the disadvantage of allowing surfactant residues to remain on the latex particles, which can be harmful to the properties of the compositions comprising the said latices.

One of the aims of the present invention is to provide a process for the preparation of latices which makes it possible to solve the abovementioned problems.

These aims and others are achieved by the present invention, a subject-matter of which is thus a process for the preparation of latices by radical aqueous emulsion polymerization in the presence:
  of at least one ethylenically unsaturated monomer,
  of at least one radical polymerization initiator, and
  of at least one surface-active block copolymer comprising at least one hydrophilic block and at least one hydrophobic block which is prepared by a "living" preparation process using a transfer agent, the said copolymer exhibiting:
  a number-average molecular mass of between 2 000 and 20 000, preferably between 4 000 and 16 000,
  a glass transition temperature of the hydrophobic block of less than 30° C., preferably of less than 25° C., and greater than $-100$C.,
  a surface tension of less than 60 millinewtons per metre (mN/m), preferably of less than 50 mN/m, measured at a concentration in demineralized water of less than or equal to $10^{-4}$ mol/l at 20° C. and under one atmosphere, and
  the transfer agent having been rendered inert with respect to the said radical polymerization.

The invention also relates to formulations which are intended to be applied in the field of building materials, in that of paints, in that of papers and in that of adhesives and pressure-sensitive adhesives and which comprise the latices prepared by the said process or the redispersible powders capable of being obtained by drying the latices.

It likewise relates to the use of the latices and redispersible powders in formulations intended to be used in particular in the construction field or in the field of paints.

However, other advantages and characteristics of the present invention will become more clearly apparent on reading the description and examples which will follow.

According to the invention, surface-active block copolymers comprising at least one hydrophilic block and at least one hydrophobic block are prepared by a "living" or "controlled" radical polymerization process involving the use of a transfer agent specifically for the purpose of controlling the said radical polymerization. The hydrophilic block preferably derives from hydrophilic monomers, and the hydrophobic block preferably derives from hydrophobic monomers.

Generally, the preceding block copolymers can be obtained by any "living" or "controlled" polymerization process, such as, for example:
  radical polymerization controlled by xanthates according to the teaching of Application WO 98/58974,
  radical polymerization controlled by dithioesters according to the teaching of Application WO 98/01478,
  polymerization using nitroxide precursors according to the teaching of Application WO 99/03894,
  radical polymerization controlled by dithiocarbamates according to the teaching of Application WO 99/31144,
  atom transfer radical polymerization (ATRP) according to the teaching of Application WO 96/30421,
  radical polymerization controlled by iniferters according to the teaching of Otu et al., Makromol. Chem. Rapid. Commun., 3, 127 (1982),
  radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995),
  group transfer polymerization according to the teaching of Webster O. W., "Group Transfer Polymerization", p. 580–588, in the "Encyclopedia of Polymer Science and Engineering", Vol. 7, edited by H. F. Mark, N. M. Bikales, C. G. Overberger and G. Menges, Wiley Interscience, New York, 1987,
  radical polymerization controlled by tetraphenylethane derivatives (D. Braun et al., Macromol. Symp., 111, 63 (1996)),
  radical polymerization controlled by organocobalt complexes (Wayland et al., J. Am. Chem. Soc., 116, 7973 (1994)).

The preferred transfer agents for implementing the controlled polymerization process are chosen from dithioesters, thioethers-thiones, dithiocarbamates and xanthates.

The preferred polymerization is the living radical polymerization using xanthates.

The invention additionally relates to a process for the preparation of these block polymers. This process consists in:

1—bringing into contact:
  at least one ethylenically unsaturated monomer,
  at least one source of free radicals, and
  at least one transfer agent of formula (I):

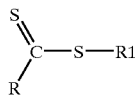
(I)

in which:
  R represents an R2O-, R2R'2N- or R3- group with:
  R2 and R'2, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R3 representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain,
  R1 represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and 2—repeating, at least once, the above operation of bringing into contact using:
  different monomers from the preceding implementation, and
  instead of the precursor compound of formula (I), the polymer resulting from the preceding implementation, and 3—rendering the transfer agent inert at the end of the polymerization.

The R1, R2, R'2 and R3 groups can be substituted by substituted phenyl or alkyl groups, substituted aromatic groups or the following groups: oxo, alkoxycarbonyl or aryloxycarbonyl (—COOR), carboxyl (—COOH), acyloxy (—O$_2$CR), carbamoyl (—CONR$_2$), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR$_2$), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

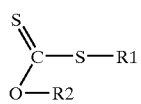
(IA)

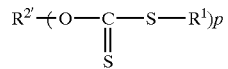
(IB)

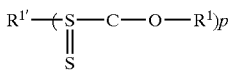
(IC)

in which:
  R2 and R2' represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted,
  R1 and R1' represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain,
  p is between 2 and 10.

During Stage 1, a first block of the polymer is synthesized with a hydrophilic or hydrophobic nature, according to the nature and the amount of the monomers used. During Stage 2, the other block of the polymer is synthesized.

The ethylenically unsaturated monomers are chosen from hydrophilic and hydrophobic monomers in the proportions appropriate for obtaining a surface-active block copolymer, the blocks of which exhibit the characteristics of the invention. According to this process, if all the successive polymerizations are carried out in the same reactor, it is generally preferable for all the monomers used during one stage to have been consumed before the polymerization of the following stage begins, therefore before the new monomers are introduced. However, it may happen that the hydrophobic or hydrophilic monomers of the preceding stage are still present in the reactor during the polymerization of the following block. In this case, these monomers generally do not represent more than 5 mol % of all the monomers and they participate in the following polymerization by contributing to the introduction of the hydrophobic or hydrophilic units into the following block.

The surface-active block copolymers prepared according to this polymerization process can be simply diblocks', with a hydrophobic block and a hydrophilic block, or even triblocks, with either a hydrophilic block framed by two hydrophobic blocks or a hydrophobic block framed by two hydrophilic blocks.

More particularly, the surface-active block copolymer can be obtained by employing, as hydrophilic monomer, at least one ethylenically unsaturated monomer chosen from:
  unsaturated ethylenic mono- and dicarboxylic acids, such as acrylic acid, methacrylic acid, itaconic acid, maleic acid or fumaric acid,
  monoalkyl esters of the dicarboxylic acids of the type mentioned with alkanols preferably having 1 to 4 carbon atoms and their N-substituted derivatives, such as, for example, 2-hydroxyethyl acrylate or methacrylate,
  amides of unsaturated carboxylic acids, such as acrylamide or methacrylamide,
  ethylenic monomers comprising a sulphonic acid group and its alkali metal or ammonium salts, for example vinylsulphonic acid, vinylbenzenesulphonic acid, alpha-acrylamidomethylpropanesulphonic acid or 2-sulphoethyl methacrylate.

However, the most preferred hydrophilic monomers are acrylic acid (AA), acrylamide (AM), 2-acrylamido-2-methylpropanesulphonic acid (AMPS) and styrenesulphonate (SS).

Mention may in particular be made, as illustration of hydrophobic monomers which can be used to constitute the hydrophilic block, of (meth)acrylic esters, vinyl esters and vinyl nitriles.

The term "(meth)acrylic esters" denotes esters of acrylic acid and of methacrylic acid with hydrogenated or fluorinated $C_1$–$C_{12}$ alcohols, preferably $C_1$–$C_8$ alcohols. Mention may be made, among the compounds of this type, of: methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate or isobutyl methacrylate. The preferred monomers are the esters of acrylic acid with linear or branched $C_1$–$C_4$ alcohols, such as methyl, ethyl, propyl and butyl acrylate.

The vinyl nitriles include more particularly those having from 3 to 12 carbon atoms, such as, in particular, acrylonitrile and methacrylonitrile. The other ethylenically unsaturated monomers, which can be used alone or as mixtures, or which can be copolymerized with the above monomers, are in particular:

carboxylic acid vinyl esters, such as vinyl acetate, vinyl versatate or vinyl propionate, vinyl halides, vinylamine amides, in particular vinylformamide or vinylacetamide, unsaturated ethylenic monomers comprising a secondary, tertiary or quaternary amino group or a heterocyclic group comprising nitrogen, such as, for example, vinylpyridines, vinylimidazole, aminoalkyl (meth) acrylates and aminoalkyl(meth)acrylamides, such as dimethylaminoethyl acrylate or methacrylate, di-tert-butylaminoethyl acrylate or methacrylate, or dimethylaminomethylacrylamide or -methacrylamide.

It is very obviously possible to include, in the composition of the block copolymers, a certain proportion of hydrophobic monomers in the hydrophilic block and a certain proportion of hydrophilic monomers in the hydrophobic block, provided that the surface-active properties and the limits of the number-average molecular mass, of the glass transition temperature of the hydrophobic group and of surface tension are adhered to.

The polymerization of the copolymer can be carried out in an aqueous and/or organic solvent medium, such as tetrahydrofuran or a linear, cyclic or branched $C_1$–$C_8$ aliphatic alcohol, such as methanol, ethanol or cyclohexanol, or a diol, such as ethylene glycol. An alcoholic solvent is more particularly recommended in the case where the hydrophilic monomers are acrylic acid (AA), acrylamide (AM), 2-acrylamido-2-methylpropanesulphonic acid (AMPS) and styrenesulphonate (SS) and the hydrophobic monomers are n-butyl acrylate, isobutyl acrylate, 2-ethylhexyl acrylate or t-butyl acrylate.

At the end of the controlled polymerization stage, the transfer agent, located at one of the chain ends of the surface-active block polymer, is rendered inert, by any appropriate means, with respect to the said subsequent radical polymerization relating to the preparation of the latex proper. It is possible for the nature of the polymerization reaction medium (for example, pH conditions, nature of the constituents of the reaction medium, monomers to be polymerized) to be sufficient per se to inactivate the transfer agent. It is recommended to mask the active chemical functional groups of the said agent by means of a suitable chemical masking agent or to destroy the transfer agent by a hydrolysis or oxidation reaction by metal catalysis or by the use of primary radicals. In the case of xanthate as transfer agent, it is recommended to render it inert, if necessary, by treatment of the copolymer formed by means of a heat treatment, for example in the temperature range 80 to 180° C., in the presence of an alcoholamine, such as triethanolamine.

The ethylenically unsaturated monomers which can be employed to prepare the latex will now be described.

Mention may very particularly be made, among suitable monomers, of those corresponding to the following formula:

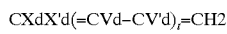

in which:

Xd and X'd, which are identical or different, represent: H, an alkyl group or a halogen, Vd and V'd, which are identical or different, represent H, a halogen or an R, OR, OCOR, NHCOH, OH, $NH_2$, NHR, $N(R)_2$, $(R)_2N^+O^-$, NHCOR, $CO_2H$, $CO_2R$, CN, $CONH_2$, CONHR or $CONR_2$ group, in which R, which are identical or different, are chosen from alkyl, aryl, aralkyl, alkaryl, alkene or organosilyl groups which are optionally perfluorinated and which are optionally substituted by one or more carboxyl, epoxy, hydroxyl, alkoxy, amino, halogen or sulphonic groups, t has the value 0 or 1.

According to a specific embodiment of the invention, the monomers employed are preferably hydrophobic monomers.

Mention may in particular be made, as illustration of hydrophobic monomers, of styrene or its derivatives, butadiene, chloroprene, (meth)acrylic esters, vinyl esters and vinyl nitriles.

The term "(meth)acrylic esters" denotes esters of acrylic acid and of methacrylic acid with hydrogenated or fluorinated $C_1$–$C_{12}$ alcohols, preferably $C_1$–$C_8$ alcohols.

The vinyl nitriles include more particularly those having from 3 to 12 carbon atoms, such as, in particular, acrylonitrile and methacrylonitrile.

It should be noted that styrene can be replaced, in all or in part, by derivatives, such as α-methylstyrene or vinyltoluene.

The other ethylenically unsaturated monomers, which can be used alone or as mixtures, or which can be copolymerized with the above monomers, are in particular:

carboxylic acid vinyl esters, vinyl halides, vinylamine amides, unsaturated ethylenic monomers comprising a secondary, tertiary or quaternary amino group or a heterocyclic group comprising nitrogen. It is likewise possible to use zwitterionic monomers, such as, for example, sulphopropyl(dimethyl)aminopropyl acrylate.

It should be noted that it is possible to employ hydrophilic monomers, such as, for example, unsaturated ethylenic mono- and dicarboxylic acids, monoalkyl esters of the dicarboxylic acids of the type mentioned with alkanols preferably having 1 to 4 carbon atoms and their N-substituted derivatives, amides of unsaturated carboxylic acids, ethylenic monomers comprising a sulphonic acid group and its alkali metal or ammonium salts, amides of unsaturated carboxylic acids, such as acrylamide, methacrylamide, N-methylol-acrylamide or N-methylolmethacrylamide, or N-acrylamides.

It should be noted that all the monomers which have been mentioned in the context of the definition of the surface-active block copolymer can be used for the preparation of the latex. Reference may thus be made to this part of the description.

Use is preferably made, as ethylenically unsaturated monomer, of at least one monomer chosen from styrene or its derivatives, butadiene, chloroprene, (meth)acrylic esters, vinyl esters and vinyl nitriles.

The polymerization reaction according to the invention takes place in the presence of a radical polymerization initiator. The latter can be chosen from the initiators conventionally used in radical polymerization. It can, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulphate or ammonium persulphate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl -N-[1,1-bis(hydroxymethyl)ethyl]propionamide), 2,2'-azobis[2-methyl-N-(2-hydroxyethyl)propionamide] or 2,2'-azobis(isobutyramide) dihydrate, redox systems comprising combinations such as:

mixtures of hydrogen peroxide, alkyl peroxide, peresters, percarbonates and the like and of any from iron salts, titanous salts, zinc formaldehyde-sulphoxylate or sodium formaldehydesulphoxylate, and reducing sugars, alkali metal or ammonium persulphates, perborates or perchlorates, in combination with an alkali metal bisulphite, such as sodium metabisulphite, and reducing sugars, alkali metal persulphates, in combination with an arylphosphinic acid, such as benzenephosphonic acid, and other similar substances, and reducing sugars.

The polymerization reaction takes place conventionally and a nonionic or anionic surfactant chosen from alkoxylated mono-, di- or trialkylphenols, alkoxylated mono-, di- or tristyrylphenols, alkoxylated fatty alcohols and alkali metal or ammonium salts of $C_8$–$C_{12}$ alkyl sulphates, fatty alcohol alkoxylated and sulphated hemiesters, $C_{12}$–$C_{18}$ alkyl sulphonate esters, and the like, can be added to the polymerization medium.

The polymerization temperature, by way of illustration, is between 50 and 120° C., more particularly between 70 and 90° C.

Thus, an embodiment of the latex polymerization process according to the invention comprises the following stages:

a) a stable aqueous preemulsion comprising the starting ethylenically unsaturated monomers and the surface-active block copolymer is prepared using, for example, from 2 to 3 parts of monomers per 1 part by weight of water, b) a reaction mixture comprising a conventional surfactant as defined above, an initiator and water is introduced into a radical polymerization reactor and from 1 to 10, preferably from 3 to 7, % by weight of preemulsion prepared in stage a) is added to the said mixture, c) the reaction mixture obtained at the end of stage b) is heated to a temperature of between 40 to 90° C., preferably between 60 and 80° C., for the purpose of generating a seed formed of latex particles in dispersion in the water, d) the preemulsion obtained in stage a) is added with an additional amount of initiator via two separate inlets of the reactor to obtain the latex, and e) optionally, the latex obtained in stage d) is heated at a temperature of between 40 and 90° C., preferably between 60 and 80° C.

It is generally recommended to use an effective amount of block copolymer so as to obtain the desired surfactant effect within the polymerization medium, which generally corresponds to using from 0.5 to 5, preferably from 1 to 4, % by weight of surface-active block copolymer with respect to the total weight of water employed during the polymerization of the latex. It is also recommended to use from 1 to 8, preferably from 2 to 5, % by weight of copolymer with respect to the total weight of the monomers employed during the polymerization of the latex.

Another subject-matter of the present invention is composed of redispersible powders capable of being obtained by drying the latex prepared by the process of the invention. The drying of the latex can be carried out in a way known per se. Thus, drying can be carried out at low temperature or, preferably, by atomization. It can be carried out in any known device, such as, for example, an atomization tower which combines a spraying carried out via a nozzle or a turbine with a stream of hot gas. The inlet temperature of the hot gas (generally air) at the column top is preferably between 100 and 115° C. and the outlet temperature is preferably between 55 and 65° C. According to an advantageous embodiment of the present invention, the drying is carried out in the presence of a drying additive. Conventional dispersing agents can be employed. Mention may be made, for example, of polyphenols, salts of glutamic acid, polyvinyl alcohol, polyvinylpyrrolidone or cellulose derivatives. It should be noted that a nonionic or anionic surfactant can also be used. In a particularly advantageous way, the content of drying additive is less than or equal to 5% by weight with respect to the polymer.

The latices prepared by the process of the present invention generally exhibit:

good resistance to $Ca^{++}$ ions at a concentration in water of greater than 0.25%, a contact angle and a surface tension which can be adjusted, good stability towards shearing, good resistance to moisture after formation of the film, a high thickening capability, and little or no tendency towards whiting.

The latices and redispersible powders which form the subject-matter of the present invention can be employed in the conventional fields of use, such as in the field of building materials, paints, paper or adhesives, including pressure-sensitive adhesives, inter alia.

Thus, the present invention likewise has as subject-matter formulations, intended for applications in the field of building materials, comprising the latex or the redispersible powders prepared by the process of the invention.

It also relates to formulations, intended for applications in the field of paints, comprising the latex or the redispersible powders.

Finally, it relates to formulations, intended for applications in the field of adhesives and pressure-sensitive adhesives, comprising the latex or the redispersible powders.

Concrete but nonlimiting examples of the invention will now be presented.

In the examples which follow:

Mn represents the number-average molecular mass Mn of the polymers; Mn is expressed in polystyrene equivalents (g/mol), Mw represents the weight-average molecular mass (g/mol), Mw/Mn represents the polydispersity index.

the polymers, before hydrolysis, are analysed by chromatography (GPC) with THF as elution solvent.

EXAMPLE 1

Preparation of a 50/50 by Weight p(BA)-b-p(AA) (poly(butyl acrylate)-poly(acrylic acid)) Diblock Polymer Comprising a Reactive End of the Xanthate Type The following mixture:

3.04 g of xanthate-A, S-ethylpropionyl O-ethyl dithiocarbonate (hereinafter known as xanthate), 21.24 g of isopropanol, and 0.82 g of azobisisobutyronitrile (AIBN), is introduced into a reactor equipped with a magnetic stirrer and a reflux column and comprising 160 g of acetone.

The mixture is subsequently stirred and maintained at reflux at 70° C. 66 g of acrylic acid (AA) and 15 g of water are added gradually over 3 hours. 0.41 g of azobisisobutyronitrile is then added after one hour of addition and then a further 0.41 g of azobisisobutyronitrile is added after a second hour of addition. Once the addition of acrylic acid is complete, the polymerization is allowed to continue for another hour. An amount of 0.20 g of reaction mixture is withdrawn as sample of PAA homopolymer.

The temperature is subsequently lowered to 65° C. by addition of 560 g of acetone. 140 g of butyl acrylate (BA) are gradually added over 3 hours while maintaining the temperature at 65° C. 0.40 g of AIBN is added at the beginning of the addition of BA. The reaction is allowed to continue for a further 3 hours.

The reaction mixture is allowed to cool and the solvents are virtually completely removed using a rotavapor (rotary evaporator). The residue obtained is dispersed in water and lyophilized. The polymers are analysed by carbon-13 nuclear magnetic resonance and by measuring their acid content.

The number-average molecular mass of the copolymer is 15 000.

The glass transition temperature of the hydrophobic block is: –54° C.

The surface tension is 55 mN/m at $10^{-4}$ mol/l.

EXAMPLE 2

Preparation of a 70/30 by Weight p(BA)-b-p(AA) (poly(butyl acrylate)-poly(acrylic acid)) Diblock Polymer Comprising a Reactive End of the Xanthate Type The following mixture:

0.61 g of xanthate-A, S-ethylpropionyl O-ethyl dithiocarbonate (hereinafter known as xanthate), 4.25 g of isopropanol, 0.16 g of azobisisobutyronitrile, is introduced, under a nitrogen atmosphere, into a reactor equipped with a magnetic stirrer and a reflux column and comprising 160 g of acetone.

The mixture is subsequently stirred and maintained at reflux at 70° C. 13.2 g of acrylic acid (AA) and 30.3 g of water are added gradually over 3 hours. 0.08 g of azobisisobutyronitrile is then added after one hour of addition and then a further 0.08 g of azobisisobutyronitrile is added after a second hour of addition. Once the addition of acrylic acid is complete, the polymerization is allowed to continue for another hour. An amount of 4.1 g of reaction mixture is withdrawn as sample of PAA homopolymer.

The temperature is subsequently lowered to 65° C. by addition of 112 g of acetone. 28 g of butyl acrylate (BA) are gradually added over 3 hours while maintaining the temperature at 65° C. 0.08 g of AIBN is added at the beginning of the addition of BA. The nitrogen purge is halted and the reaction is allowed to continue for a further 12 hours. The reaction mixture is allowed to cool and the solvents are virtually completely removed using a rotavapor (rotary evaporator). The residue obtained is dispersed in water and lyophilized. The polymers are analysed by carbon-13 nuclear magnetic resonance and by measuring their acid content.

The number-average molecular mass is 15 000.

The glass transition temperature of the hydrophobic block is: –54° C.

The surface tension is 52 mN/m at $10^{-4}$ mol/l.

EXAMPLE 3

Preparation of a 60/40 by Weight p(BA)-b-p(AA) (poly(butyl acrylate)-poly(acrylic acid)) Diblock Polymer Comprising a Reactive End of the Xanthate Type The following mixture:

1.53 g of xanthate-A, S-ethylpropionyl O-ethyl dithiocarbonate (hereinafter known as xanthate), 10.72 g of isopropanol, and 0.42 g of azobisisobutyronitrile (AIBN), is introduced into a reactor equipped with a magnetic stirrer and a reflux column and comprising 160 g of acetone.

The mixture is subsequently stirred and maintained at reflux at 70° C. 44.0 g of acrylic acid (AA) and 75.4 g of water are added gradually over 3 hours. 0.21 g of azobisisobutyronitrile is then added after one hour of addition and then a further 0.21 g of azobisisobutyronitrile is added after a second hour of addition. Once the addition of acrylic acid is complete, the polymerization is allowed to continue for another hour. An amount of 10.98 g of reaction mixture is withdrawn as sample of PAA homopolymer.

The temperature is subsequently lowered to 65° C. by addition of 280 g of acetone. 60 g of butyl acrylate (BA) are gradually added over 3 hours while maintaining the temperature at 65° C. 0.20 g of AIBN is added at the beginning of the addition of BA. The nitrogen purge is halted and the reaction is allowed to continue for a further 12 hours. The reaction mixture is allowed to cool and the solvents are virtually completely removed using a rotavapor (rotary evaporator). The residue obtained is dispersed in water and lyophilized. The polymers are analysed by carbon-13 nuclear magnetic resonance and by measuring their acid content.

The number-average molecular mass of the copolymer is 15 000.

The glass transition temperature of the PBA hydrophobic block is −54° C., and 105° C. for the PAA block.
The surface tension is 58.8 mN/m at $10^{-4}$ mol/l.

EXAMPLE 4

Preparation of an 80/20 by Weight p(BA)-b-p(AA) (poly(butyl acrylate)-poly(acrylic acid)) Diblock Polymer Comprising a Reactive End of the Xanthate Type The following mixture:

0.61 g of xanthate-A, S-ethylpropionyl O-ethyl dithiocarbonate (hereinafter known as xanthate), 4.21 g of isopropanol, and 0.16 g of azobisisobutyronitrile (AIBN), is introduced into a reactor equipped with a magnetic stirrer and a reflux column and comprising 160 g of acetone.

The mixture is subsequently stirred and maintained at reflux at 70° C. 8.80 g of acrylic acid (AA) and 30.35 g of water are added gradually over 3 hours. 0.08 g of azobisisobutyronitrile is then added after one hour of addition and then a further 0.08 g of azobisisobutyronitrile is added after a second hour of addition. Once the addition of acrylic acid is complete, the polymerization is allowed to continue for another hour. An amount of 3.7 g of reaction mixture is withdrawn as sample of PAA homopolymer.

The temperature is subsequently lowered to 65° C. by addition of 112 g of acetone. 32 g of butyl acrylate (BA) are gradually added over 3 hours while maintaining the temperature at 65° C. 0.08 g of AIBN is added at the beginning of the addition of BA. The nitrogen purge is halted and the reaction is allowed to continue for a further 12 hours. The reaction mixture is allowed to cool and the solvents are virtually completely removed using a rotavapor (rotary evaporator). The residue obtained is dispersed in water and lyophilized. The polymers are analysed by carbon-13 nuclear magnetic resonance and by measuring their acid content.

The number-average molecular mass is 15 000.
The glass transition temperature of the PBA hydrophobic block is: −54° C., and 105° C. for the PAA block.

EXAMPLE 5

Preparation of a 55/45 by Weight p(BA)-b-p(AA) (poly(butyl acrylate)-poly(acrylic acid)) Diblock Polymer Comprising a Reactive End of the Xanthate Ttype The following mixture:

0.61 g of xanthate-A, S-ethylpropionyl O-ethyl dithiocarbonate (hereinafter known as xanthate), 4.31 g of isopropanol, and 0.17 g of azobisisobutyronitrile (AIBN), is introduced into a reactor equipped with a magnetic stirrer and a reflux column and comprising 160 g of acetone.

The mixture is subsequently stirred and maintained at reflux at 70° C. 19.80 g of acrylic acid (AA) and 30.31 g of water are added gradually over 3 hours. 0.08 g of azobisisobutyronitrile is then added after one hour of addition and then a further 0.08 g of azobisisobutyronitrile is added after a second hour of addition. Once the addition of acrylic acid is complete, the polymerization is allowed to continue for another hour. An amount of 4.76 g of reaction mixture is withdrawn as sample of PAA homopolymer.

The temperature is subsequently lowered to 65° C. by addition of 112 g of acetone. 22 g of butyl acrylate (BA) are gradually added over 3 hours while maintaining the temperature at 65° C. 0.08 g of AIBN is added at the beginning of the addition of BA. The nitrogen purge is halted and the reaction is allowed to continue for a further 12 hours. The reaction mixture is allowed to cool and the solvents are virtually completely removed using a rotavapor (rotary evaporator). The residue obtained is dispersed in water and lyophilized. The polymers are analysed by carbon-13 nuclear magnetic resonance and by measuring their acid content.

The number-average molecular mass of the copolymer is 15 000.
The glass transition temperature of the p(BA) hydrophobic block is −54° C., and 105° C. for the p(AA) block.
The surface tension is 52.0 mN/m at $10^{-4}$ mol/l.

EXAMPLE 6

Preparation of a Diblock Polymer with a p(BA)/p(AM) Ratio by Weight: 60/40 p(BA)$_{3000}$-b-p(AM)$_{2000}$ (poly(butyl acrylate)-polyacrylamide) Comprising a Reactive End of the Xanthate Type 1) Stage 1: Synthesis of the p(BA)$_{3000}$-X (X=xanthate) monoblock

| Composition of the reaction mixture: | |
|---|---|
| Tetrahydrofuran | 66.38 g |
| Butyl acrylate | 24.00 g |
| Xanthate A | 1.664 g |
| AIBN (Azobisisobutyronitrile) | 0.263 g |

The above ingredients are charged to a 250 ml polymerization reactor equipped with a magnetic stirrer. The reaction is carried out under a dry nitrogen atmosphere for 20 min and the reaction mixture is subsequently heated to 60° C. and maintained at this temperature for 20 hours. Small amounts of samples of polymers are withdrawn from time to time to monitor the conversion. The content of solid material is 28.09%.

2) Stage 2: Synthesis of the p(BA)$_{3000}$-b-p(AM)$_{2000}$-X diblock

| Composition of the reaction mixture: | |
|---|---|
| Tetrahydrofuran | 63.00 g |
| Acrylamide | 16.00 g |
| AIBN (Azobisisobutyronitrile) | 0.263 g |

The above ingredients are charged to a dry receptacle under a dry nitrogen atmosphere for 20 min and then transferred into the polymerization reactor using a syringe with 2 nozzles. At the end of the transfer, the reaction mixture is subsequently heated to 60° C. and maintained at this temperature for 20 hours. Small amounts of samples of polymers are withdrawn from time to time to monitor the conversion. The content of solid material is 24.59%. The reaction mixture is allowed to cool and the solvents are virtually completely removed using a rotavapor (rotary evaporator).

The number-average molecular mass of the copolymer is 5 000.
The glass transition temperature of the PBA hydrophobic block is −54° C., and 165° C. for the PAM block.
The surface tension is 58 mN/m.

EXAMPLE 7

Preparation of a Diblock Polymer with a p(BA)/p(AA) Ratio by Weight: 80/20 p(BA)$_{4000}$-b-p(AA)$_{1000}$ (poly(butyl acrylate)-poly(acrylic acid)) Comprising a Reactive End of the Xanthate Type in Ethanol 1) Stage 1: Synthesis of the p(BA)$_{4000}$-X monoblock

| Composition of the reaction mixture: | |
|---|---|
| Ethanol | 79.00 g |
| Butyl acrylate | 32.00 g |
| Xanthate A | 1.664 g |
| AIBN (Azobisisobutyronitrile) | 0.263 g |

The above ingredients are charged to a 250 ml polymerization reactor equipped with a magnetic stirrer. The reaction is carried out under a dry nitrogen atmosphere for 20 min and the reaction mixture is subsequently heated to 60° C. and maintained at this temperature for 20 hours. Small amounts of samples of polymers are withdrawn from time to time to monitor the conversion. The content of solid material is 30.04%.

2) Stage 2: Synthesis of the p(BA)$_{4000}$-b-p(AA)$_{1000}$-X diblock

| Composition of the reaction mixture: | |
|---|---|
| Ethanol | 19.00 g |
| Acrylic acid | 8.00 g |
| AIBN (Azobisisobutyronitrile) | 0.066 g |

The above ingredients are charged to a dry receptacle under a dry nitrogen atmosphere for 20 min and then transferred into the polymerization reactor using a syringe with 2 nozzles. At the end of the transfer, the reaction mixture is subsequently heated to 60° C. and maintained at this temperature for 20 hours. Small amounts of samples of polymers are withdrawn from time to time to monitor the conversion. The content of solid material is 30%.

The reaction mixture is allowed to cool and the solvents are virtually completely removed using a rotavapor (rotary evaporator).

The number-average molecular mass of the copolymer is 5 000.

The glass transition temperature of the pBA hydrophobic block is −54° C., and 105° C. for the pAA block.

EXAMPLE 8

Synthesis of the p(BA)$_{7500}$-b-p (AA)$_{7500}$-X Diblock with a p(BA)/p(AA) Ratio by Weight: (50/50)

A) Stage 1: Synthesis of the p(BA)$_{7500}$-X monoblock

| Composition of the reaction mixture: | |
|---|---|
| Tetrahydrofuran | 48.00 g |
| Butyl acrylate | 20.00 g |
| Xanthate A | 0.555 g |
| AIBN (Azobisisobutyronitrile) | 0.088 g |

The above ingredients are charged to a 250 ml polymerization reactor equipped with a magnetic stirrer. The reaction is carried out under a dry nitrogen atmosphere for 20 min and the reaction mixture is subsequently heated to 60° C. and maintained at this temperature for 20 hours. Small amounts of samples of polymers are withdrawn from time to time to monitor the conversion. The content of solid material is 30.2%.

2) Stage 2: Synthesis of the p(BA)$_{7500}$-b-p(AA)$_{7500}$-X diblock

| Composition of the reaction mixture: | |
|---|---|
| Tetrahydrofuran | 47.00 g |
| Acrylic acid | 20.00 g |
| AIBN (Azobisisobutyronitrile) | 0.088 g |

The above ingredients are charged to a dry receptacle under a dry nitrogen atmosphere for 20 min and then transferred into the polymerization reactor using a syringe with 2 nozzles. At the end of the transfer, the reaction mixture is subsequently heated to 60° C. and maintained at this temperature for 20 hours. Small amounts of samples of polymers are withdrawn from time to time to monitor the conversion.

The content of solid material is 30%.

The reaction mixture is allowed to cool and the solvents are virtually completely removed using a rotavapor (rotary evaporator).

The number-average molecular mass of the copolymer is 15 000.

glass transition temperature of the p(BA) hydrophobic block is −54° C., and 105° C. for the p(AA) block.

The surface tension is 55 mN/m.

EXAMPLE 9

Synthesis of the p(BA)$_{1000}$-b-p(AA)$_{4000}$-X Diblock with a p(BA)/p(AA) Ratio by Weight: (20/80)

A) Stage 1: Synthesis of the p(BA)$_{1000}$-X monoblock

The procedure of stage A) of Example 8 is repeated exactly, except that the reaction mixture:

| Tetrahydrofuran | 23.00 g |
|---|---|
| Butyl acrylate | 8.00 g |
| Xanthate A | 1.664 g |
| AIBN (Azobisisobutyronitrile) | 0.263 g, | is used.

The content of solids is 30.2%.

B) Stage 2: Synthesis of the p(BA)$_{1000}$-b-p(AA)$_{4000}$-X diblock

The procedure of stage B) of Example 8 is repeated exactly, except that the reaction mixture:

| Tetrahydrofuran | 75.00 g |
|---|---|
| Acrylic acid | 32.00 g |
| AIBN (Azobisisobutyronitrile) | 0.263 g, | is used.

The reaction mixture is allowed to cool and the solvents are virtually completely removed using a rotavapor (rotary evaporator).

The number-average molecular mass of the copolymer is 5 000.

The glass transition temperature of the pBA hydrophobic block is −54° C., and 105° C. for the pAA block.

The surface tension is 45.11 mN/m.

EXAMPLE 10

Synthesis of the $p(BA)_{2000}$-b-$p(AM)_{3000}$-X Diblock with a p(BA)/p(AM) Ratio by Weight: (40/60)

A) Stage 1: Synthesis of the $p(BA)_{1000}$-X monoblock

The procedure of stage A) of Example 8 is repeated exactly, except that the reaction mixture:

| | |
|---|---|
| Tetrahydrofuran | 30.00 g |
| Butyl acrylate | 16.00 g |
| Xanthate A | 1.664 g |
| AIBN (Azobisisobutyronitrile) | 0.263 g, | is used.

The content of solids is 37.4%.

B) Stage 2: Synthesis of the $p(BA)_{2000}$-b-$p(AM)_{3000}$-X diblock

The procedure of stage B) of Example 8 is repeated exactly, except that the reaction mixture:

| | |
|---|---|
| Tetrahydrofuran | 100.00 g |
| Acrylamide | 24.00 g |
| AIBN (Azobisisobutyronitrile) | 0.263 g, | is used.

The reaction mixture is allowed to cool and the solvents are virtually completely removed using a rotavapor (rotary evaporator).

The number-average molecular mass of the copolymer is 5 000.

The glass transition temperature of the p(BA) hydrophobic block is −54° C., and 165° C. for the p(AM) block.

The surface tension is 52 mN/m.

EXAMPLE 11

Stage of Decomposition of Thiocarbonylthio (dithiocarbonate or xanthate) at the Chain End of the Copolymers This decomposition stage is general and applies to all the copolymers of Examples 1 to 10: 0.09 g of triethanolamine is added to a 30% by weight solution in tetrahydrofuran of 6 g of a copolymer as obtained in any one of Examples 1 to 10 in a sealed receptacle equipped with a magnetic stirrer. The receptacle is stirred and heated at 160° C. in an oil bath for 16 h. The polymer which has been rendered inert is characterized by $^{13}C$ NMR. The ratio of the C=S groups at 216 ppm to the C=O groups in the polymer at 176 ppm decreases as a function of the reaction time. The C=S groups disappear at the end of the reaction.

EXAMPLE 12

Preparation of a Latex Comprising the Block Copolymer Prepared in Example 6 above Process for the preparation of the latices:

81 g of deionized water, 5.20 g of MMA (methyl methacrylate), 4.7 g of butyl acrylate (BA) and 1.00 g of methacrylic acid are introduced into a reactor equipped with a magnetic stirrer and a reflux column.

The mixture is heated to 80° C. with stirring and purged with nitrogen.

Furthermore, a preemulsion of monomers is prepared in the following way:

116 g of deionized water, 5.20 g of MMA (methyl methacrylate), 4.7 g of butyl acrylate (BA), 1.00 g of methacrylic acid and 0.2 g of the block copolymer prepared in Example 6 above are mixed.

10 g of the abovementioned preemulsion are rapidly added to the mixture at 80° C., followed by 25% by weight of an initiator solution comprising 228.2 g/mol of ammonium persulphate and 342.3 g/mol of $Na_2CO_3$. The new reaction mixture is maintained at 80° C. for 15 minutes. The remainder of the preemulsion of monomers and of initiator solution is charged to the reactor over 3 hours while maintaining the temperature at 80° C. throughout the process of addition of the reactants. Once this addition has been completed, the reaction mixture is maintained at 85° C. for 30 minutes. It is then cooled to 30° C. and filtered through a 100 mesh sieve and the pH is adjusted using a 28% aqueous ammonia solution.

The final latex obtained exhibits the following properties:

a content of solid matter of 44.78%;

a coagulum of 0.12%;

a particle size of the latex of 134.7 nm;

good resistance to $Ca^{++}$ ions at a concentration in water of greater than 0.25%;

a water contact angle of the latex film of 76.5°;

stability towards shearing of 2 min 30 s at a pH of 6.27;

whiting: invisible;

minimum film formation temperature: 12° C.

EXAMPLE 13

Preparation of a Latex Comprising the Block Copolymer Prepared in Example 10 above:

The procedure of Example 12 above is repeated exactly, except that the block copolymer used is that prepared in Example 3.

The final latex obtained exhibits the following properties:

a content of solid matter of 45.00%;

a coagulum of 0.30%;

a particle size of the latex of 108.3 nm;

good resistance to $Ca^{++}$ ions at a concentration in water of greater than 0.25%;

a water contact angle of the latex film of 66.9°;

stability towards shearing of 4 min 40 s at a pH of 9.03;

whiting: visible (slight);

minimum film formation temperature: 12° C.

COMPARATIVE EXAMPLE 14

Preparation of a Latex without a Block Copolymer

The procedure of Example 12 above is repeated exactly, except that no block copolymer is used.

The final latex obtained exhibits the following properties:

a content of solid matter of 45.00%;

a coagulum of 0.12%;

stability towards shearing of 5 min 10 s at a pH of 8.99;

whiting: highly visible;

a particle size of the latex of 127.0 nm;

good resistance to $Ca^{++}$ ions at a concentration in water of less than 0.25%;

a water contact angle of the latex film of 62°;

minimum film formation temperature: 12° C.

It is apparent that the latex obtained exhibits inferior properties, in particular with regard to whiting and resistance to $Ca^{++}$ ions.

What is claimed is:

1. A process for the preparation of a latex comprising the steps of:

a) radical aqueous emulsion polymerization of a reaction mixture, to obtain a latex, said reaction mixture comprising at least one ethylenically unsaturated monomer, at least one radical polymerization initiator and at least an effective amount of a surface-active block copolymer comprising at least one hydrophilic block and at least one hydrophobic block which is prepared by a "living" preparation process using a transfer agent, the said copolymer exhibiting:

a number-average molecular mass of between 2 000 and 20 000 g/mol, a glass transition temperature of the hydrophobic block of less than 30° C., and greater than −100° C., and a surface tension of less than 60 millinewtons per metre (mN/m), measured at a concentration in demineralized water of less than or equal to $10^{-4}$ mol/l at 20° C. and under one atmosphere, the transfer agent having been rendered inert with respect to the said radical polymerization, aaa) a stable acieous preemulsion comprising starting ethylenically unsaturated monomers and the surface-active block copolymer is prepared, bbb) a reaction mixture comprising a conventional surfactant, an initiator and water is introduced into a radical polymerization reactor comprising two openings and from 1 to 10% by weight of preemulsion prepared in step aaa) is added to the said mixture, ccc) the reaction mixture obtained at the end of stage bbb) is heated to a temperature of between 40 and 90° C., for the purpose of generating a seed formed of latex particles in dispersion in the water, ddd) the preemulsion obtained in stage aaa) is added with an additional amount of initiator via the two separate openings of the reactor to produce the latex, and eee) optionally, the latex obtained in stage ddd) is heated at a temperature of between 40 and 90° C., and b) recovery of the latex thus obtained.

2. The process according to claim 1, wherein the copolymer exhibits:

a number-average molecular mass of between 4 000 and 16 000 g/mol, a glass transition temperature of the hydrophobic block of less than 25° C., and a surface tension of less than 50 millinewtons per metre.

3. The process according to claim 1, wherein the transfer agent is selected from the group consisting of dithioesters, thioethers-thiones, dithiocarbamates and xanthates.

4. The process according to claim 1, wherein the block copolymer is prepared by a process comprising the following steps:

aa) as a first implementation, bringing into contact to obtain a polymer:

at least one ethylenically unsaturated monomer,
at least one source of free radicals, and
at least one transfer agent of formula (I):

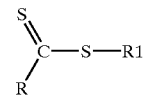

wherein:

R represents an R2O-, R2R'2N- or R3- group with:

R2 and R'2, which are identical or different, representing: (i) an alkyl, acyl, aryl, alkene or alkyne group, (ii) an optionally aromatic, saturated or unsaturated carbonaceous ring, or (iii) a saturated or unsaturated heterocycle, groups and rings (i), (ii) and (iii) being optionally substituted, R3 representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, dialkyl- or diarylphosphinato group, or a polymer chain, R1 represents (i) an optionally substituted alkyl, acyl, aryl, alkene or alkyne group (ii) a carbonaceous ring which is saturated or unsaturated and which is optionally substituted or aromatic, or (iii) an optionally substituted, saturated or unsaturated heterocycle or a polymer chain, bb) repeating, at least once, the above operation of bringing into contact using:

different monomers from the preceding implementation, and instead of the precursor compound of formula (I), the polymer resulting from the preceding implementation, and cc) rendering the transfer agent inert at the end of the polymerization.

5. The process according to claim 4, wherein step cc) comprises masking of active chemical functional groups of the transfer agent by means of a masking agent or destruction of the transfer agent by a hydrolysis or oxidation reaction by metal catalysis or by use of primary radicals.

6. The process according to claim 4, wherein the hydrophilic block derives from hydrophilic monomers selected from the group consisting of:

unsaturated ethylenic mono- and dicarboxylic acids, monoalkyl esters of the dicarboxylic acids of the type mentioned with alkanols preferably having 1 to 4 carbon atoms and their N-substituted derivatives, amides of unsaturated carboxylic acids, and ethylenic monomers comprising a sulphonic acid group and its alkali metal or ammonium salts.

7. The process according to claim 4, wherein the hydrophobic block derives hydrophobic monomers selected from the group consisting of:

esters of acrylic acid and of methacrylic acid with hydrogenated or fluorinated $C_1$–$C_{12}$ alcohols, vinyl nitriles having from 3 to 12 carbon atoms, carboxylic acid vinyl esters, vinyl halides, vinylamine amides, and unsaturated ethylenic monomers comprising a secondary, tertiary or quaternary amino group, or a heterocyclic group comprising nitrogen.

8. The process according to claim 7, wherein the hydrophobic block derives hydrophobic monomers selected from the group consisting of methyl acrylate, ethyl acrylate, propyl acrylate, n-butyl acrylate, isobutyl acrylate, 2-ethylhexyl acrylate, t-butyl acrylate, methyl methacrylate, ethyl methacrylate, n-butyl methacrylate, isobutyl methacrylate, acrylonitrile, methacrylonitrile, vinyl acetate, vinyl versatate, vinyl propionate, vinylformamide, vinylacetamide, vinylpyridines, vinylimidazole, dimethylaminoethyl acrylate or methacrylate, di-tert-butylaminoethyl acrylate or methacrylate, and dimethylaminomethylacrylamide or methacrylamide.

9. The process according to claim 8, wherein the polymerization of the copolymer is carried out in tetrahydrofuran or in a linear, cyclic or branched $C_1$–$C_8$ aliphatic alcohol.

10. The process according to claim 9, wherein the alcohol is methanol, ethanol, cyclohexanol or ethylene glycol, and wherein the hydrophilic monomer is acrylic acid (AA), acrylamide (AM), 2-acrylamido-2-methylpropanesulphonic acid (AMPS) or styrenesulphonate (SS).

11. The process according to claim 1, wherein:

in step bbb) of preemulsion prepared is of between 3 and 7%, in step ccc), the temperature is of between 60 and 80° C., and in optional step ccc), the temperature is of between 60 and 80° C.

12. The process according to claim 1, wherein the ethylenically unsaturated monomer or monomers are selected from the group consisting of styrene, styrene derivatives, butadiene, chloroprene, (meth)acrylic esters and vinyl nitriles.

13. The process according to claim 1, wherein 0.5 to 5% by weight of the surface-active block copolymer with respect to the total weight of water is employed during the polymerization of the latex, or 1 to 8% by weight of the surface-active block copolymer copolymer with respect to the total eight of the monomers is employed during the polymerization of the latex.

14. The process according to claim 13, wherein 1 to 4% by weight of the surface-active block copolymer with respect to the total weight of water is employed during the polymerization of the latex, and 2 to 5% by weight of the surface-active block copolymer with respect to the total weight of the monomers is employed during the polymerization of the latex.

15. The process according to claim 1, wherein 0.5 to 5% by weight of the surface-active block copolymer with respect to the total weight of water is employed during the polymerization of the latex, or of 1 to 8% by weight of the surface-active block copolymer copolymer with respect to the total weight of the monomers is employed during the polymerization of the latex.

16. The process according to claim 15, wherein 1 to 4% by weight of the surface-active block copolymer with respect to the total weight of water is employed during the polymerization of the latex, and of 2 to 5% by weight of the surface-active block copolymer with respect to the total weight of the monomers is employed during the polymerization of the latex.

* * * * *